(12) United States Patent
Hovhannisyan et al.

(10) Patent No.: US 11,146,035 B2
(45) Date of Patent: Oct. 12, 2021

(54) ACTIVE FIBER PACKAGE

(71) Applicant: ELBIT SYSTEMS ELECTRO-OPTICS—ELOP LTD., Rehovot (IL)

(72) Inventors: Grigor Hovhannisyan, Rehovot (IL); Zachary Sacks, Rehovot (IL); Asaf Turm, Rehovot (IL)

(73) Assignee: ELBIT SYSTEMS ELECTRO-OPTICS—ELOP LTD., Rehovot (IL)

( * ) Notice: Subject to any disclaimer, the term of this patent is extended or adjusted under 35 U.S.C. 154(b) by 0 days.

(21) Appl. No.: 17/261,987

(22) PCT Filed: Jul. 4, 2019

(86) PCT No.: PCT/IL2019/050746
§ 371 (c)(1),
(2) Date: Jan. 21, 2021

(87) PCT Pub. No.: WO2020/021527
PCT Pub. Date: Jan. 30, 2020

(65) Prior Publication Data
US 2021/0249833 A1 Aug. 12, 2021

(30) Foreign Application Priority Data
Jul. 24, 2018 (IL) .......................................... 260758

(51) Int. Cl.
*H01S 3/067* (2006.01)
*H01S 3/04* (2006.01)
*H01S 3/00* (2006.01)

(52) U.S. Cl.
CPC ........ *H01S 3/06704* (2013.01); *H01S 3/0014* (2013.01); *H01S 3/0404* (2013.01);
(Continued)

(58) Field of Classification Search
CPC ............. H01S 3/06704; H01S 3/06708; H01S 3/0014; H01S 3/0404; H01S 3/0407; H01S 3/06754
See application file for complete search history.

(56) References Cited

U.S. PATENT DOCUMENTS

| 7,400,812 B2 | 7/2008 | Seifert et al. |
| 8,493,651 B1 | 7/2013 | Hu et al. |

(Continued)

FOREIGN PATENT DOCUMENTS

| CN | 105977770 A | * | 9/2016 | ............... H01S 3/04 |
| CN | 107123921 A | | 9/2017 | |

(Continued)

OTHER PUBLICATIONS

English Translation of CN 105977770 A (Year: 2016).*

*Primary Examiner* — Yuanda Zhang
(74) *Attorney, Agent, or Firm* — Browdy and Neimark, P.L.L.C.

(57) ABSTRACT

The present invention provides an active fiber package for use in a fiber laser, amplifier, or ASE source comprising: a plate-shape base comprising a groove having a configuration of at least two spirals for receiving and fixedly holding an active fiber therein, said at least two spirals are coplanar enabling visibility of said active fiber, the outer loop of one spiral transitioning smoothly to the outer loop of another spiral, and the inner loop of each one of said spirals transitioning smoothly into a relatively short straight section; wherein a portion of said straight section of one of said spirals spliced to a coupling fiber, and wherein multiple inner loops of each one of said spirals in proximity to said straight section having a relatively low radius of curvature for enabling tight coiling of said active fiber, thus, for reducing thermal modal instability (TMI) and increasing lasing power.

20 Claims, 10 Drawing Sheets

(52) U.S. Cl.
CPC ........ *H01S 3/0407* (2013.01); *H01S 3/06708* (2013.01); *H01S 3/06712* (2013.01); *H01S 3/06754* (2013.01)

(56) References Cited

U.S. PATENT DOCUMENTS

| | | |
|---|---|---|
| 9,325,151 B1 | 4/2016 | Fini et al. |
| 9,680,279 B2 | 6/2017 | Johnson et al. |
| 2001/0021300 A1 | 9/2001 | Yoshida et al. |
| 2005/0041702 A1 | 2/2005 | Fermann et al. |
| 2011/0310469 A1 | 12/2011 | Nagayasu et al. |
| 2013/0230061 A1 | 9/2013 | Dong et al. |

FOREIGN PATENT DOCUMENTS

| | | |
|---|---|---|
| CN | 107153241 A | 9/2017 |
| CN | 107634442 A | 1/2018 |

\* cited by examiner

ACTIVE FIBER PACKAGE

FIELD OF THE INVENTION

The present invention relates to active optical fibers. More particularly, the present invention relates to an apparatus for accommodating loops of an active optical fiber for use in a fiber laser, an amplifier, and the like.

BACKGROUND OF THE INVENTION

High power fiber lasers and amplifiers require an apparatus for accommodating long lengths of active fiber, often arranged in loops which, if not properly managed, may get damaged from mechanical, thermal, or optical causes. Such fibers require a certain range of bend radii and protection from sharp edges for proper operation.

Previous designs are based on either coiled or multilayer structures. Martin Seifert to U.S. Pat. No. 7,400,812 discloses an optical apparatus for accommodating optical fiber, i.e., for wrapping the active fiber around the internal side of a cylinder, or more accurately, the fiber is loaded into the internal surface such that it expands like a spring into the coil. Such a coil is not planar as the input and output fibers exit at different heights. In addition, loading the fiber may be difficult as the fiber is not visible along the entire length, and connecting splices to both sides may not be straight forward especially if the splice needs to be in close proximity to the entrance or exit of the coil.

To solve the problem as such of the fiber entering and exiting the coil in different planes, Yongon Hu, et al., to U.S. Pat. No. 8,493,651 describes an apparatus and method that provide management and cooling of an optical fiber by looping the optical fiber around the inner surface of a heat-conducting cylinder and around the outer surface of the heat-conducting cylinder, such that the optical fiber enters and exits the heat-conducting cylinder on substantially the same plane. The coil is wrapped with fiber both around the inner and outer surfaces. The fiber is neither visible nor completely planar. In addition, making the input/output splice has difficulties associated with achieving a precise location, and there remains a danger of placing twists in the fiber.

Hao Dong, et al., to US2013/0230061 describes a fiber laser cavity package having improved fiber management and thermal management capability and methods of making such fiber laser cavity package. Such multi-layer planar package scheme does not entail fiber visibility and presents difficulties during fiber loading.

SUMMARY OF THE INVENTION

The active fiber package of the present invention is advantageous for (a) having a substantially planar configuration that enables visibility of the entire fiber, and easy integration of the active fiber with other fiber coupled components either in a laser or amplifier, (b) having a coiled configuration which controls the modal content and suppresses thermal modal instability, and thus, allows an increase in laser power, (c) having a configuration which enables arranging the fiber therein while preventing twists and bends that may lead to additional losses, and (d) removing the deposited heat.

Thus, in accordance with some embodiments of the present invention, there is provided an active fiber package for use in a fiber laser, amplifier, or ASE source comprising:

a plate-shape base comprising a groove having a configuration of at least two spirals for receiving and fixedly holding an active fiber therein, said at least two spirals are coplanar enabling visibility of said active fiber, the outer loop of one spiral transitioning smoothly to the outer loop of another spiral, and the inner loop of each one of said spirals transitioning smoothly into a relatively short straight section;

wherein a portion of said straight section of one of said spirals spliced to a coupling fiber, and wherein multiple inner loops of each one of said spirals in proximity to said straight section having a relatively low radius of curvature for enabling tight coiling of said active fiber, thus, for reducing thermal modal instability (TMI) and increasing lasing power.

Furthermore, in accordance with some embodiments of the present invention, the package allows for complete visibility of the fiber.

Furthermore, in accordance with some embodiments of the present invention, the active fiber package allows for complete visibility of the fiber during an assembly process.

Furthermore, in accordance with some embodiments of the present invention, the active fiber package allows for partial visibility of the fiber during operation.

Furthermore, in accordance with some embodiments of the present invention, the groove is having a u-groove shape, a v-groove shape, or a rectangular shape.

Furthermore, in accordance with some embodiments of the present invention, the groove is continuous.

Furthermore, in accordance with some embodiments of the present invention, each one of said spirals is circular.

Furthermore, in accordance with some embodiments of the present invention, the said spirals are circular, oval, elliptical or any other shape or a combination thereof.

Furthermore, in accordance with some embodiments of the present invention, an input and output sides enter and exit at the same height into and from the coil of the active fiber.

Furthermore, in accordance with some embodiments of the present invention, the exit and entrance to said spiral smoothly transition to above the spiral.

Furthermore, in accordance with some embodiments of the present invention, the fiber crosses over said spirals to enter or exit the inner radius of each of said spirals, wherein an air gap separates between said spirals and said fiber crossing over said spirals.

Furthermore, in accordance with some embodiments of the present invention, the coplanar spirals entail integration of the active fiber with fiber components selected from pump combiners, fiber Bragg gratings (FBG), output connector, mode strippers, and a delivery fiber.

Furthermore, in accordance with some embodiments of the present invention, a potting compound selected from optically clear and/or thermally transmissive adhesives securing the fiber within said groove.

Furthermore, in accordance with some embodiments of the present invention, the potting compound selected from a fiber recoat material, a thermal adhesive, a light transmittive adhesive and a combination thereof.

Furthermore, in accordance with some embodiments of the present invention, the length of said straight section containing the splice ranging between 5 to 50 mm from the entrance of the spiral.

Furthermore, in accordance with some embodiments of the present invention, at least one temperature sensor is embedded in said plate-shape base to monitor power losses by temperature rise.

Furthermore, in accordance with some embodiments of the present invention, the plate-shape base is a heat conducting base allowing for cooling of the active fiber and or splices.

Furthermore, in accordance with some embodiments of the present invention, the fiber package further comprises a cooling system for cooling said active fiber when said laser cavity package is in operation.

Furthermore, in accordance with some embodiments of the present invention, the cooling system comprises a substantially planar plate-shape layer situated underneath said plate-shape base, said plate-shape layer comprises at least one groove channel for for cooling the active fiber during operation.

Furthermore, in accordance with some embodiments of the present invention, a fluid seal is used for sealing said plate-shape layer and said plate-shape base.

Furthermore, in accordance with some embodiments of the present invention, an o-ring is positioned in said at least one groove channel of said plate-shape layer for tracing said fluid channel.

Furthermore, in accordance with some embodiments of the present invention, the cooling system comprising at least one pipe made of a thermally conducting material selected from metals, alloys and the like for transfering heat to a liquid or gas.

Furthermore, in accordance with some embodiments of the present invention, the cooling system recirculates either water, liquid metal, gas or any other fluid.

Furthermore, in accordance with some embodiments of the present invention, a cooling temperature kept by said cooling system ranges between 15 and 35 degrees Celcius.

Furthermore, in accordance with some embodiments of the present invention, the said plate-shape base and/or said plate-shape layer are made of thermally conducting material selected from metals, alloys, glass and a combination thereof.

Furthermore, in accordance with some embodiments of the present invention, the fiber package comprises at least one window section for positioning said active fiber in the groove lines of said spirals.

Furthermore, in accordance with some embodiments of the present invention, the window section is used for positioning said fiber while skipping at least one groove line of said spirals.

Furthermore, in accordance with some embodiments of the present invention, the active fiber is monitored with at least one of a thermal camera and a thermal sensor embaded in said plate-shape base for detecting changes in the cooling system temperature or changes in the scattered light spectrum.

Furthermore, in accordance with some embodiments of the present invention, the active fiber is selected from few-mode to multi-mode fibers including LMA-YDF-20/400, LMA-YDF-25/400, LMA-YDF-25/250, and LMA-YDF-30/400 family of fibers and different dopant concentration fibers.

Furthermore, in accordance with some embodiments of the present invention, the active fiber is selected from low NA fibers, photonic band gap fibers (PBGF), and low NA solid core fibers.

Furthermore, in accordance with some embodiments of the present invention, the radius of curvature of said LMA-YDF-20/400 family of fibers ranging between 1 to 40 cm and preferably between 4 to 8 cm.

BRIEF DESCRIPTION OF THE INVENTION

DETAILED DESCRIPTION OF THE INVENTION

Figure 1A:
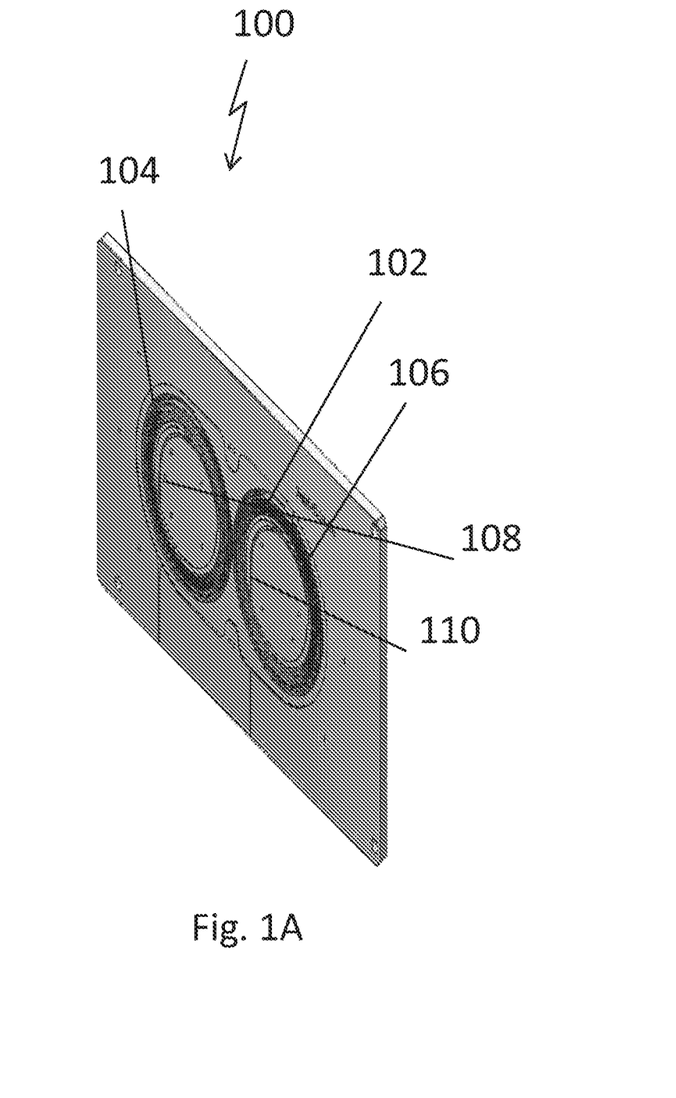
FIGS. 1A&B illustrate a double spiral active fiber plate-shape base in accordance with some embodiments of the present invention.
Figure 1B:
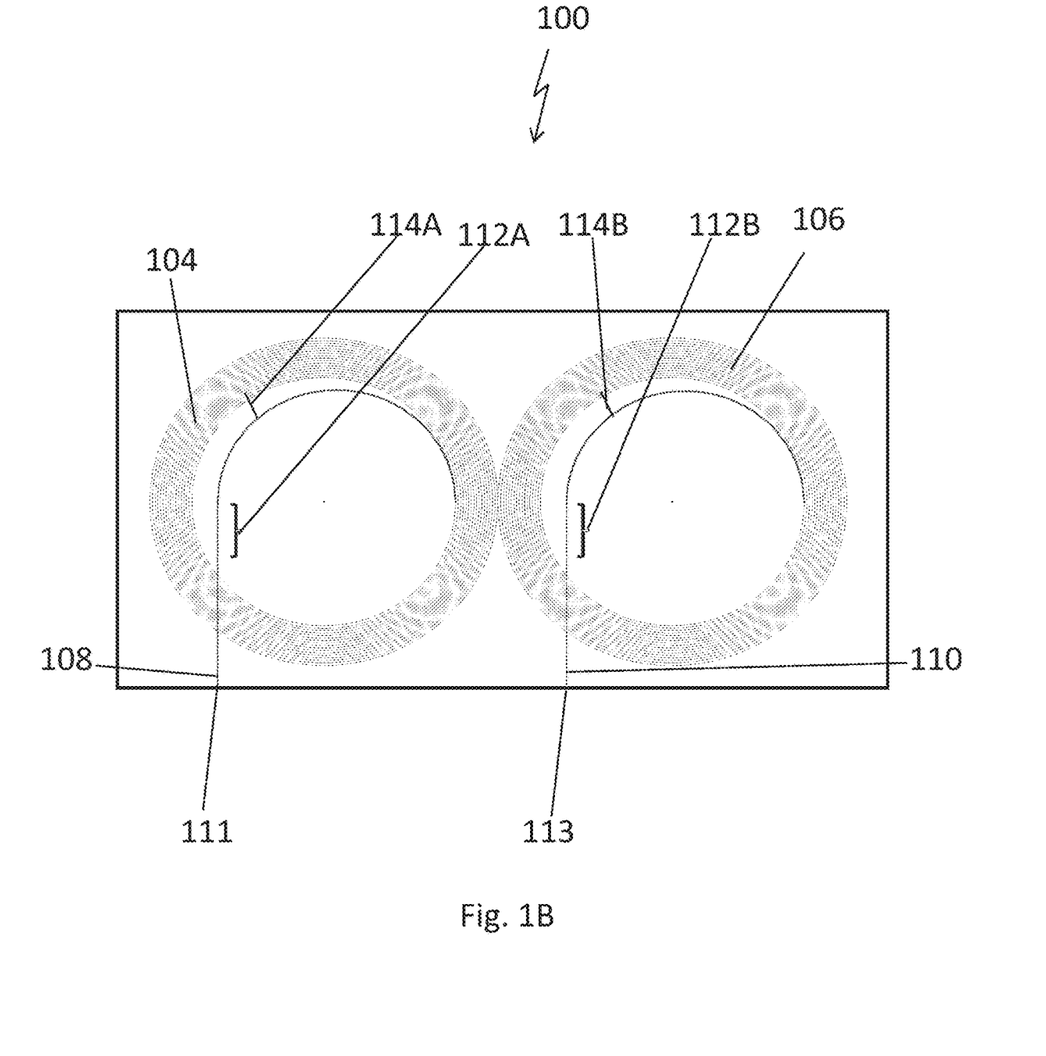

FIGS. 1A&B illustrate a double spiral active fiber plate-shape base 100 in accordance with some embodiments of the present invention.

Double spiral active fiber plate-shape base 100, adapted for receiving and fixedly holding an active fiber therein, includes a groove 102 having a configuration of at least two spirals, first spiral 104 and second spiral 106, for receiving and fixedly holding an active fiber in the spiral regions.

In accordance with some embodiments, groove 102 may be a continuous u-groove shape, v-groove shape, or rectangular shape.

As seen in the figures, first spiral 104 and second spiral 106 have a circular configuration which enables arranging the fiber therein while preventing twists and bends that may lead to losses. The circular shape allows for maximum higher order mode curvature loss to aid in thermal modal instability suppression. However, first spiral 104 and second spiral 106 may also be oval, elliptical or any other shape with no straight sections.

To secure the fiber within groove 102, a potting compound such as fiber recoat material (Luvantix PC-373, or MyPolymers MY-137), a thermal adhesive, and/or a light transmittive adhesive (NuSil LS-3246) may be applied to the fiber. In accordance with some embodiments of the present invention, it is essential to use here a potting compound that is highly transparent for allowing the light to escape from the fiber rather than being absorbed. Such absorption can cause high temperature spots resulting in fiber burn or potting compound burn.

As seen in FIG. 1B, the outer loop of first spiral 104 transitioning smoothly to the outer loop of second spiral 106, and the inner loop of each one of the spirals transitioning smoothly into a straight section e.g., first straight section 108 and second straight section 110.

To prevent splice failure, the splice itself should be located in a straight part of the fiber 108 close to the entrance to the spiral. Furthermore, to suppress thermal modal instability (TMI) and thereby increasing laser power, the section of the fiber spliced to an input fiber should be in close proximity to the part of the spiral with a relatively low radius of curvature, e.g., section 112A or 112B. The length of the active fiber in the straight section 108 or 110 preferably ranges between 5 to 80 mm which then, in certain embodiements, terminates in a splice to a passive fiber.

As seen in FIGS. 1A&B, first spiral 104 and second spiral 106 are coplanar enabling (a) easy integration of the active fiber with other fiber components such as for instance with other fiber coupled components including pump combiners, fiber Bragg gratings (FBG), output connector, mode strippers, a delivery fiber, and/or other passive fibers and (b) visibility and monitoring of the entire active fiber, i.e., complete observation of hot spots and the like, complete visibility of the fiber during an assembly process, and partial visibility of the fiber during operation.

In accordance with some embodiments, the active fiber may be monitored with a thermal camera. In other embodiments the entire active fiber is not visible but covered partially by optically opaque materials such as clamps or heat sinks.

As seen in FIGS. 1A&B, the circular region of each one of spirals 104 & 106 receives the major portion of said active fiber.

Figure 2A:
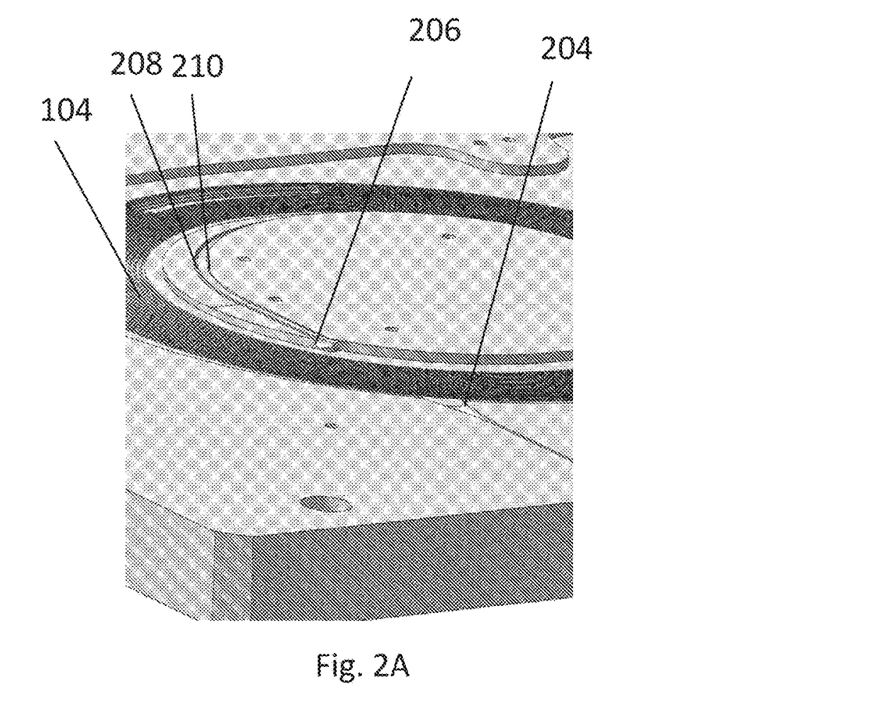
FIGS. 2A&B are perspective and cross-sectional views of a portion of the plate-shape base of FIG. 1 respectively.
Figure 2B:
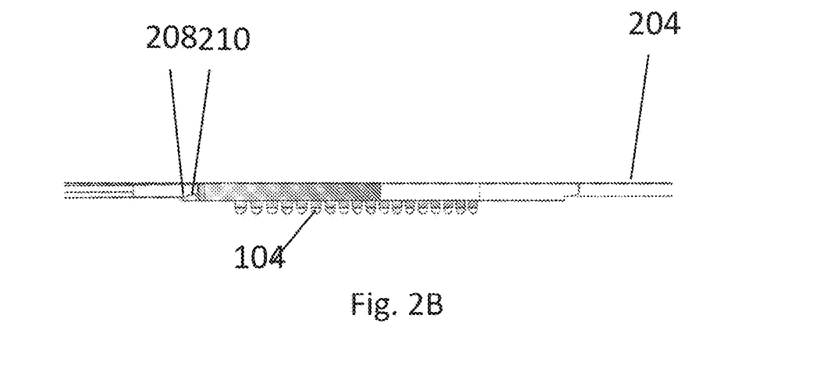

In accordance with some embodiments of the present invention, the spirals are coplanar, however, as seen in FIGS. 2A&B, the surface of plate-shape base 100 is not entirely planar, instead, the exit and entrance to the spirals smoothly transition to elevated surfaces above spirals 104 & 106.

FIGS. 2A&B are perspective and cross-sectional views of a portion of plate-shape base 100 respectively. As seen in the figures, plate-shape base 100 is not entirely planar; instead, points 204 and 206 are at a surface above spiral 104 (spiral 106 is not shown). Such configuration is essential for guiding the fiber to the inner radius of spiral 104 (and from the inner radius of spiral 104 when exiting), i.e., prior to entering spiral 104, the fiber passes through points 204 and 206 and crosses over spiral 104. From point 206, the fiber continues in groove 208 & 210 on a surface which slopes down gradually to point 212, i.e., down to the planar surface of spiral 104.

Figure 3A:
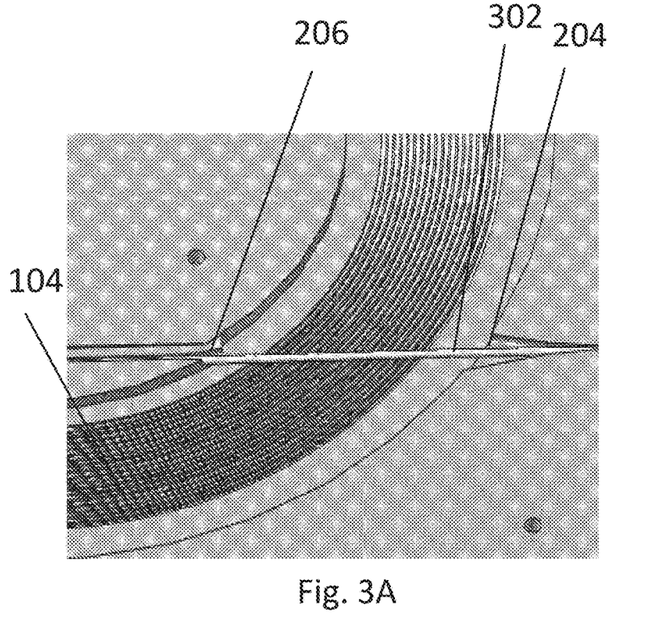
FIGS. 3A&B are perspective and cross-sectional views of a portion of the plate-shape base of FIG. 1 with a fiber positioned in the plate-shape base.
Figure 3B:
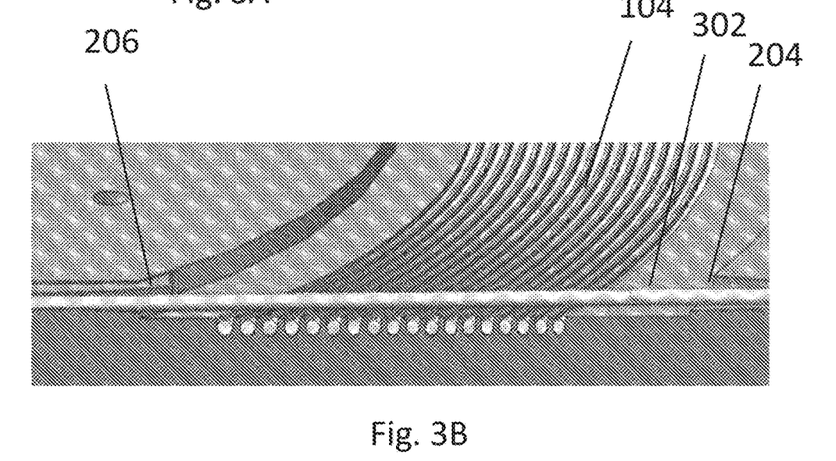

FIGS. 3A&B are perspective and cross-sectional views of a portion of plate-shape base 100 showing a fiber 302 passing through points 204 and 206 and entering spiral 104 through the inner radius of spiral 104. As seen in the figures, points 204 and 206 are considerably above spirals 104 & 106, thus, an air gap separates fiber 302 from the spirals underneath in this specific embodiment.

In accordance with some embodiments of the present invention, thermal modal instability (TMI) may mainly occur at the first several inner loops of the active fiber due to the close proximity to the input pump power launch point with associated temperature gradients.

In order to increase the thermal modal instability threshold, the double spiral active fiber plate-shape base 100 is designed to have circular spirals where the inner loops, sections 114A&B, have a lower radius of curvature than the spiral which enables tight coiling of the active fiber, and thus, stripping all modes greater than a single mode, thus, reducing thermal modal instability (TMI) and increasing lasing power. Accordingly, as seen in FIG. 1B, splices 112A and 112B are within straight sections 108 and 110 close to the part of the spiral with the lower radius of curvature, e.g., close to sections 114A and 114B respectively.

It should also be noted that the coil tends to strip any higher order modes from the splice, either launched into the splice or generated by the splice, into the active fiber.

In accordance with some embodiments of the present invention, active fiber plate-shape base 100 is suitable for LMA-YDF-20/400 type fiber that can be pumped with various diodes such as 915 nm diodes, 976 nm diodes and the like. In certain embodiments the 976 nm pump diodes are wavelength locked in order to ensure the central pump wavelength a narrow spectral width.

In accordance with some embodiments of the present invention, plate-shape base 100 may be designed for various other fibers selected from Coherent's (Nufern) LMA-YDF-20/400 family of fibers and its variants including polarization maintaining fibers (PLMA-YDF-20/400), mode matched fibers (LMA-YDF-20/400-M), high energy fibers, and different dopant concentration fibers and the like. Other fiber manufactures include NLight and Coractive.

In accordance with some embodiments of the present invention, for the 20/400 family, the optimal bending radius is between 1 and 40 cm and preferably between 4 and 8 cm (typically 5 cm).

Other fiber families that also support multiple modes such as LMA-YDF-25/400, LMA-YDF-25/250, LMA-YDF-30/250, and LMA-YDF-30/400, may also be used.

In accordance with some embodiments of the present invention, fibers that are normally single mode at low powers and suffer multimode operation at higher pump power may also be used. These fibers include low NA fibers such as photon crystal fibers (PCF), photonic band gap fibers (PBGF), and low NA solid core fibers. Optimal bending radii for these types of fibers are between 1 and 80 cm on the fiber numerical aperture (NA).

In accordance with some embodiments of the present invention, the optimal radius of curvature of the inner loops of the fiber may be determined experimentally by measuring the laser efficiency, i.e., pump power versus output power, while simultaneously monitoring beam quality or modal content (M-squared). According to some embodiments, the ideal radius of the inner loops is that for which the M-squared of the output beam is in the desired range, less than 1.4, less than 1.3, less than 1.2, or less than 1.1, while power efficiency is monitored.

Figure 9:
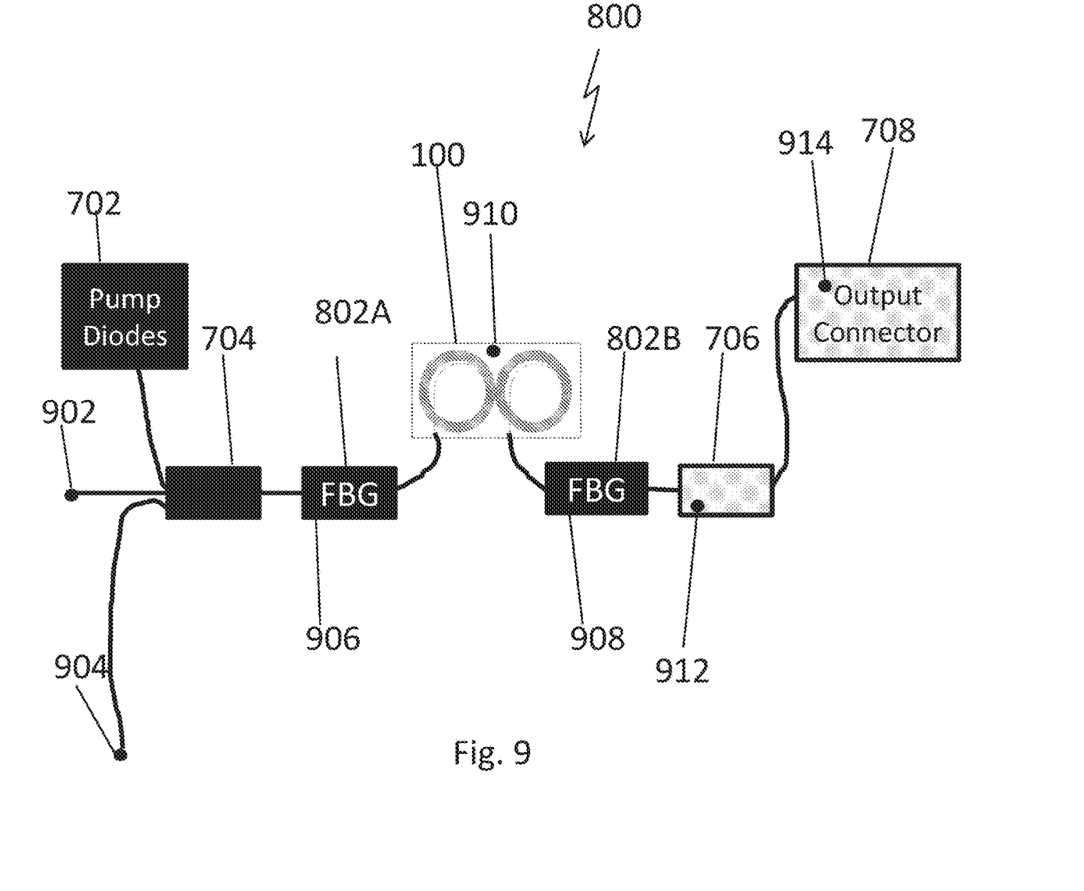
FIG. 9 shows the resonator of FIG. 8 including several points at which TMI may be measured in accordance with some embodiments of the present invention.

According to some embodiments of the present invention, the radius is determined by the modal instability threshold that can be monitored experimentally (see FIG. 9).

Figure 4:
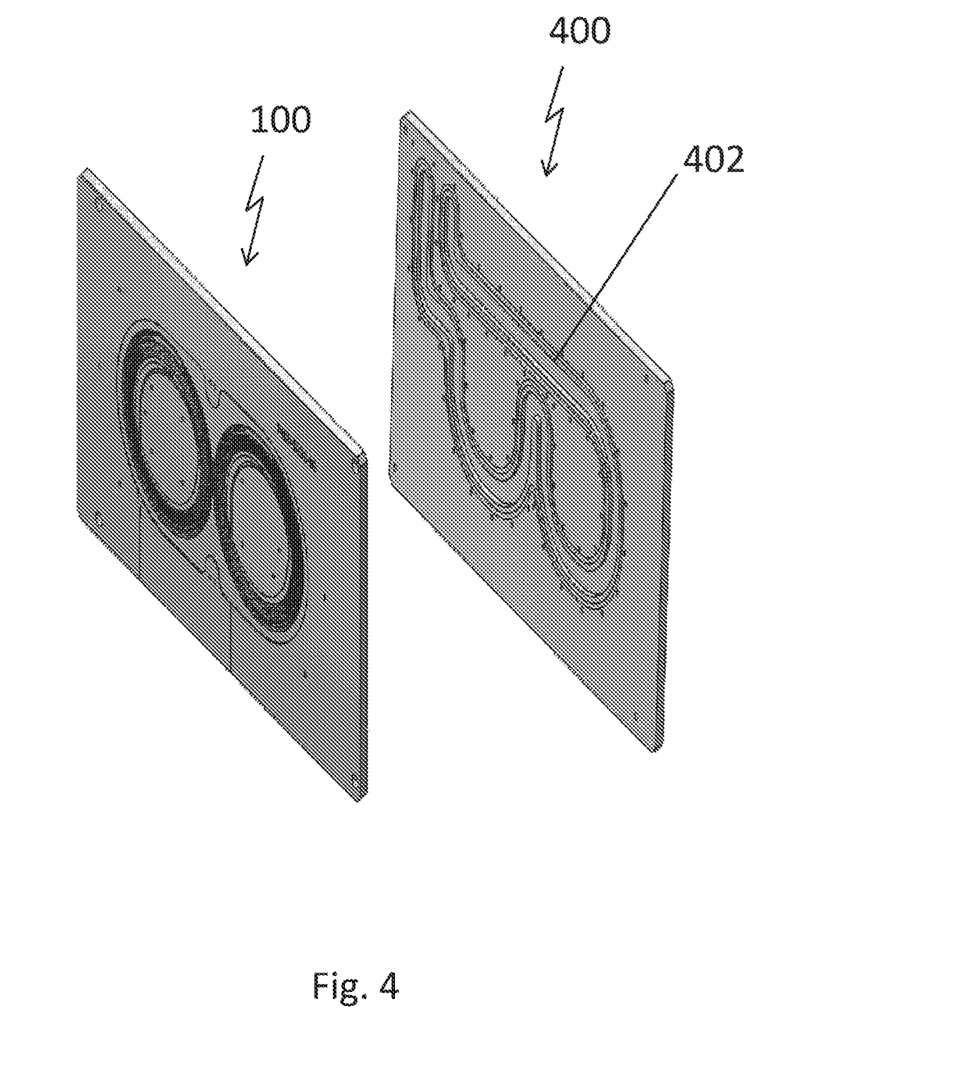
FIG. 4 shows a double spiral active fiber plate-shape base and a substantially planar plate-shape cooling layer in accordance with some embodiments of the present invention.

FIG. 4 shows a double spiral active fiber plate-shape base 100 and a substantially planar plate-shape cooling layer 400 in accordance with some embodiments of the present invention.

In accordance with some embodiments of the present invention, spiral active fiber plate-shape base 100 is a heat conducting base allowing for single side cooling of the active fiber and or splices.

Plate-shape cooling layer 400 includes at least one groove channel 402 having a configuration compatible with the circular spirals of plate-shape base 100 for receiving and fixedly holding at least one fluid channel for cooling the active fiber during operation.

During operation, plate-shape base 100 is situated above and in physical contact with plate-shape cooling layer 400 to entail sufficient heat dissipation and thus to allow continuous operation of the fiber laser cavity under a specific operational condition.

In accordance with some embodiments of the present invention, fluid seal (gas or liquid type seal) may be required between plate-shape base 100 and plate-shape cooling layer 400. In the case of certain fluids (certain liquids and gas), an o-ring may be placed in groove channel 402 for tracing the fluid channel in plate-shape cooling layer 400. In accordance with some embodiments of the present invention, double spiral active fiber plate-shape base 100 and plate-shape cooling layer 400 may be made of thermally conducting materials such as metals, alloys, glass and a combination thereof.

It should be noted that any heat exchange means other than the above-described plate-shape cooling layer 400 may be used for releasing heat from double spiral active fiber plate-shape base 100 in accordance with some embodiments of the present invention.

In accordance with some embodiments of the present invention, double spiral active fiber plate-shape base 100 may be incased in a ready-to-use package (shown and described in FIG. 5) which may include at least one window section for adjusting the length of the fiber.

Figure 5:
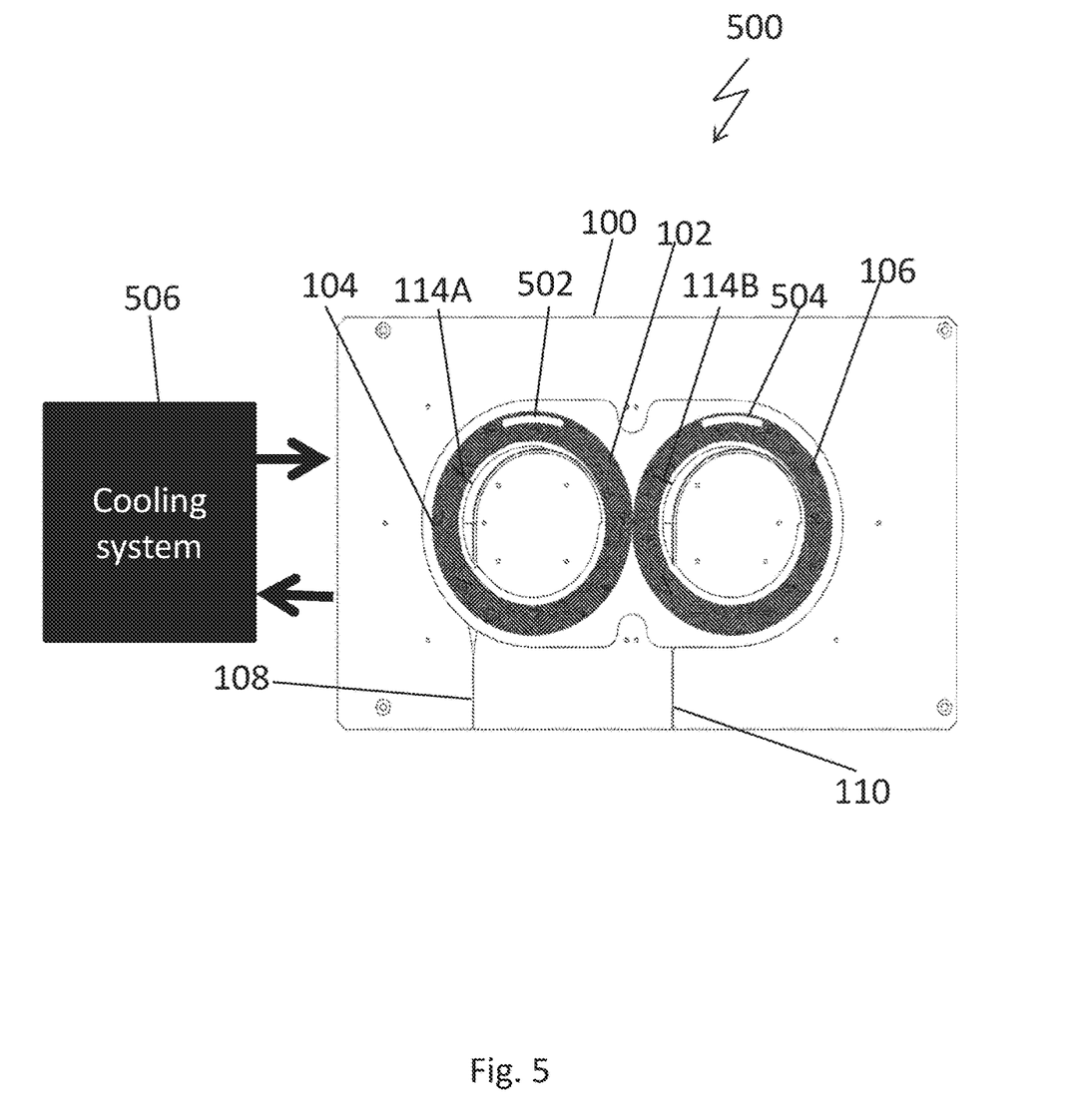
FIG. 5 shows a ready-to-use manufactured active fiber package in accordance with some embodiments of the present invention.

FIG. 5 shows a ready-to-use manufactured active fiber package 500 in accordance with some embodiments of the present invention.

Seen in the figure, fiber package 500 comprising plate-shape base 100 and cooling system 506. Plate-shape base 100 comprising groove 102 having a configuration of at least two spirals for receiving and fixedly holding an active fiber therein.

In accordance with some embodiments, groove 102 is either u-groove shape, v-groove shape, or rectangular shape.

As seen in the figure, first spiral 104 and second spiral 106 have a circular configuration which enables arranging the fiber therein while preventing twists and bends that may lead to losses. The circular shape allows for maximum higher order mode curvature loss to aid in thermal modal instability suppression. However, first spiral 104 and second spiral 106 may also be oval, elliptical or any other shape with no straight sections.

The at least two spirals are coplanar enabling complete visibility, or partial visibility in other embodiments, of the active fiber, the outer loop of first spiral 104 transitioning smoothly to the outer loop of second spiral 106, and the inner loop of each one of the spirals transitioning smoothly into a straight section e.g., first straight section 108 and second straight section 110.

In accordance with some embodiments of the present invention, to secure the fiber within groove 102, a potting compound such as fiber recoat material (Luvantix PC-373, or MyPolymers MY-137), a thermal adhesive, and/or a light transmittive adhesive (NuSil LS-3246) is applied to the fiber. A high material transparency allows the light to escape from the fiber rather than being absorbed in the fiber. Such absorption can cause high temperature spots resulting in fiber burn.

To prevent splice failure, the splice itself should be located in a straight part of the fiber 108 close to the entrance to the spiral. The length of the active fiber in the straight section 108 or 110 preferrably ranges between 5 to 80 mm which then, in certain embodiements, terminates in a splice to a passive fiber.

To reduce thermal modal instability (TMI) and thereby increasing laser power, the section of the fiber spliced to an input fiber is in close proximity to the part of the spiral with a relatively low radius of curvature, e.g., section 112A or section 112B.

As seen in the figure, first spiral 104 and second spiral 106 are coplanar entailing (a) easy integration of the active fiber with other fiber components such as for instance with other fiber coupled components including pump combiners, fiber Bragg gratings (FBG), output connector, mode strippers, a delivery fiber, and/or other passive fibers and (b) visibility and monitoring of the entire active fiber, i.e., complete observation of hot spots and the like, complete visibility of the fiber during an assembly process, and partial visibility of the fiber during operation.

In accordance with some embodiments, the active fiber is monitored with either a thermal sensor embedded in double spiral active fiber plate-shape base 100 or a thermal camera.

In accordance with some embodiments of the present invention, the circular region of each one of spirals 104 & 106 receives the major portion of said active fiber, and the input and output sides, input side 111 and output side 113 or vice versa, enter and exit at the same height into and from the coil of the active fiber.

In accordance with some embodiments of the present invention, the spirals are coplanar, however, the surface of double spiral active fiber plate-shape base 100 is not entirely planar, instead, the exit and entrance to the spirals smoothly transition to elevated surfaces above the spirals.

In order to increase the thermal modal instability threshold, double spiral active fiber plate-shape base 100 is designed to have circular spirals where the inner loops, sections 114A&B, have a lower radius of curvature than the spiral which enables tight coiling of the active fiber, and thus, stripping all modes greater than a single mode, thus, reducing thermal modal instability (TMI) and increasing lasing power. Accordingly, the splice is within straight section 108 close to the part of the spiral with the lower radius of curvature, e.g., close to section 114A. It should also be noted that the coil tends to strip any higher order modes from the splice, either launched into the splice or generated by the splice, into the active fiber.

In accordance with some embodiments of the present invention, active fiber plate-shape base 100 is suitable for LMA-YDF-20/400 type fiber that can be pumped with various diodes including 915 nm, 976 nm diodes and the like.

In certain embodiments the 976 nm pump diodes are wavelength locked in order to ensure the central pump wavelength and narrow spectral width.

Double spiral active fiber plate-shape base 100 may be designed for various other fibers selected from Coherent's (Nufern) LMA-YDF-20/400 family of fibers and its variants including polarization maintaining fibers (PLMA-YDF-20/400), mode matched fibers (LMA-YDF-20/400-M), high energy fibers, and different dopant concentration fibers and the like. Other fiber manufactures include NLight and Coractive.

In accordance with some embodiments of the present invention, for the 20/400 family, the optimal bending radius is between 1 and 40 cm and preferably between 4 and 8 cm (typically 5 cm).

Other fiber families that also support multiple modes such as LMA-YDF-25/400, LMA-YDF-25/250, LMA-YDF-30/250, and LMA-YDF-30/400, may also be used.

In accordance with some embodiments of the present invention, fibers that are normally single mode at low powers and suffer multimode operation at higher pump power may also be used. These fibers include low NA fibers such as photon crystal fibers (PCF), photonic band gap fibers (PBGF), and low NA solid core fibers. The optimal bending radii for these types of fibers are between 1 and 80 cm on the fiber numerical aperture (NA).

In accordance with some embodiments of the present invention, the optimal radius of curvature of the inner loops of the fiber is determined experimentally by measuring the laser efficiency, i.e., pump power versus output power, while simultaneously monitoring beam quality or modal content (M-squared). According to some embodiments, the ideal radius of the inner loops is that for which the M-squared of the output beam is in the desired range, less than 1.4, less than 1.3, less than 1.2, or less than 1.1, while power efficiency is monitored.

According to some embodiments of the present invention, the radius is determined by the modal instability threshold that can be monitored experimentally. Monitoring TMI threshold is performed by monitoring the amount of stripped light that is not in the fiber core, i.e., the fiber first or second clad, with a power meter, fast photodetector, or camera, in certain embodiments through an unused pump combiner leg or fiber tap.

In accordance with some embodiments of the present invention, spiral active fiber plate-shape base 100 is a heat conducting base allowing for single side cooling of the active fiber and or splices.

In accordance with some embodiments of the present invention, cooling system 506 comprises a substantially plate-shape cooling layer (layer 400 shown and described in FIG. 4) situated underneath and in physical contact with plate-shape base 100 to enable sufficient heat dissipation and thus to allow continuous operation of the fiber laser cavity under a specific operational condition. The plate-shape cooling layer (layer 400 shown in FIG. 4) includes at least one groove channel (groove channel 402 shown in FIG. 4) having a configuration compatible with the circular spirals of plate-shape base 100 for receiving and fixedly holding at least one fluid channel for cooling the active fiber during operation.

Cooling system 506 further comprises pipes made of highly thermally conducting materials, such as, for instance, metals, alloys and the like, for transfering heat to a liquid or gas.

In accordance with some embodiments of the present invention, fluid seal (gas or liquid type seal) may be required between plate-shape base 100 and plate-shape cooling layer 400. In the case of certain fluids (certain liquids and gas), an O-ring may be placed in groove channel 402 for tracing the fluid channel in plate-shape cooling layer 400.

According to some embodiments of the present invention, cooling system 506 may utilize a heat exchanger to recirculate either water, (e.g., water recirculating chiller), liquid metal, gas or any other fluid. The cooling temperature may be preferably between 15-35 degrees Celcius.

According to some embodiments of the present invention, active fiber package 400 includes at least one temperature sensor embedded in the double spiral active fiber plate-shape base 100 to monitor power losses.

It should be noted that any heat exchange means other than the plate-shape cooling layer (layer 400 of FIG. 4) may be used for releasing heat from double spiral active fiber plate-shape base 100 in accordance with some embodiments of the present invention.

In addition, as seen in the figure, active fiber package 500 includes at least one window section such as window section 502 and window section 504 for positioning a shorter fiber in the spiral groove lines. In accordance with some embodiments of the present invention, when the fiber is not long enough to fit in the entire length of the spirals, window section 502 and/or window section 504 may be used for positioning the fiber, i.e., for skipping at least one spiral groove line. As seen and described below in FIG. 6B, when a relatively short fiber is used, only the inner and outer spiral groove lines may be used.

Figure 6A:
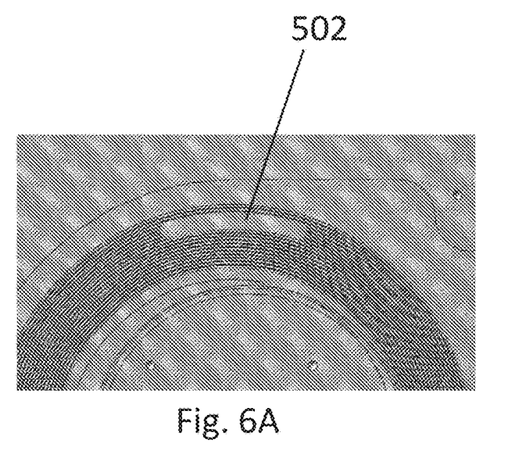
FIG. 6A illustrates the use of a full length fiber.
Figure 6B:
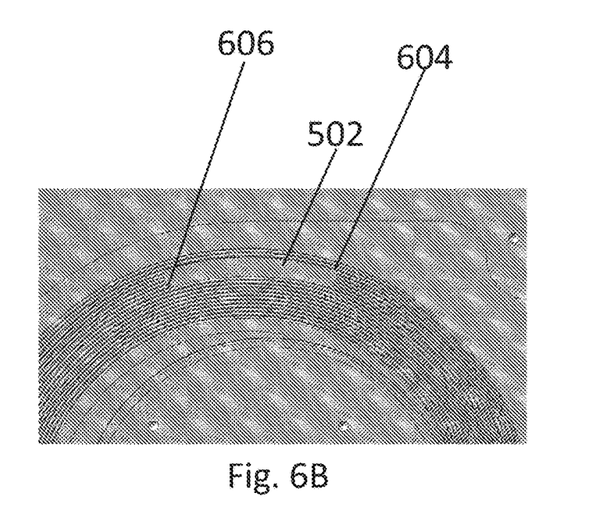
FIG. 6B illustrates the use of a shorter fiber in double spiral active fiber plate-shape base of FIG. 1.

FIG. 6A illustrates the use of a full length fiber, and FIG. 6B illustrates the use of a shorter fiber in accordance with some embodiments of the present invention. In FIG. 6A the entire spiral groove is occupied by the fiber. However, in FIG. 6B a shorter fiber occupies only some of the spital groove lines. As seen in FIG. 6B, several groove lines are skipped when the fiber reaches point 604 and crosses over to point 606.

According to some embodiments of the present invention, such window section (s) may be of various shapes and sizes.

Figure 7:
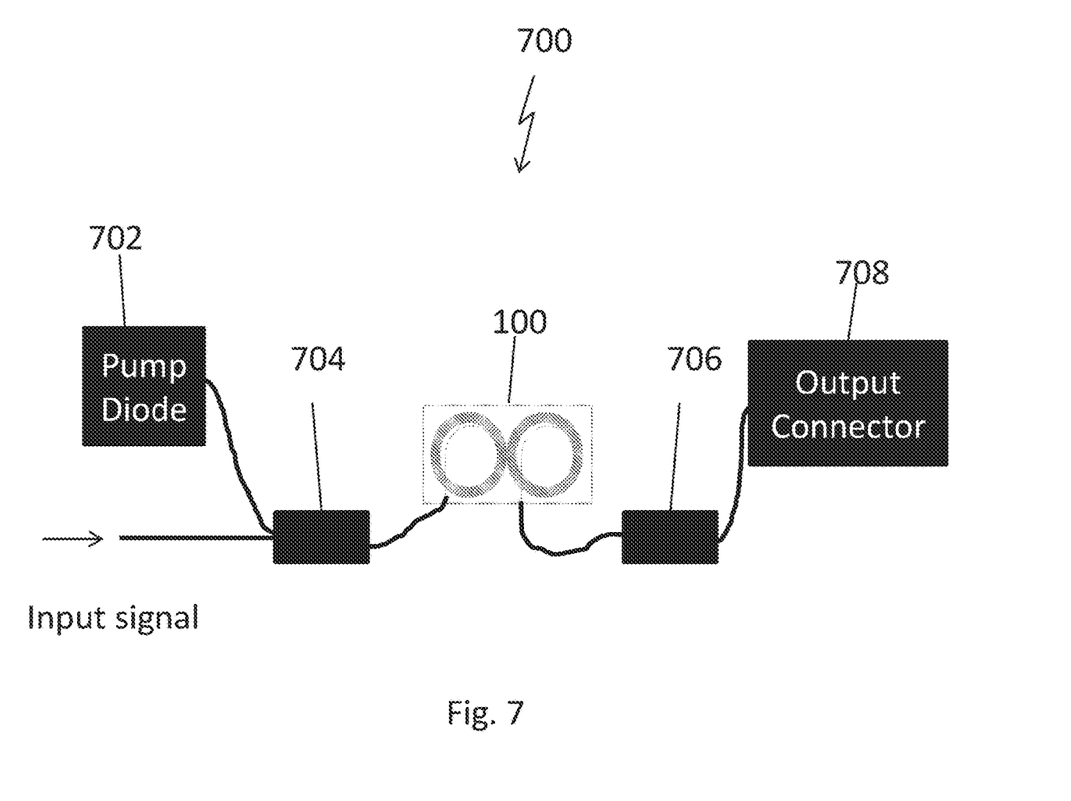
FIG. 7 shows the double spiral active fiber plate-shape base of FIG. 1 being used in a fiber amplifer.

FIG. 7 shows the double spiral active fiber plate-shape base 100 being used in a fiber amplifier 700. Fiber amplifier 700 includes a pump diode 702, a pump-signal combiner 704, a mode stripper 706, an output connector 708, and double spiral active fiber plate-shape base 100 that is implemented between pump-signal combiner 704 and mode stripper 706.

Figure 8:
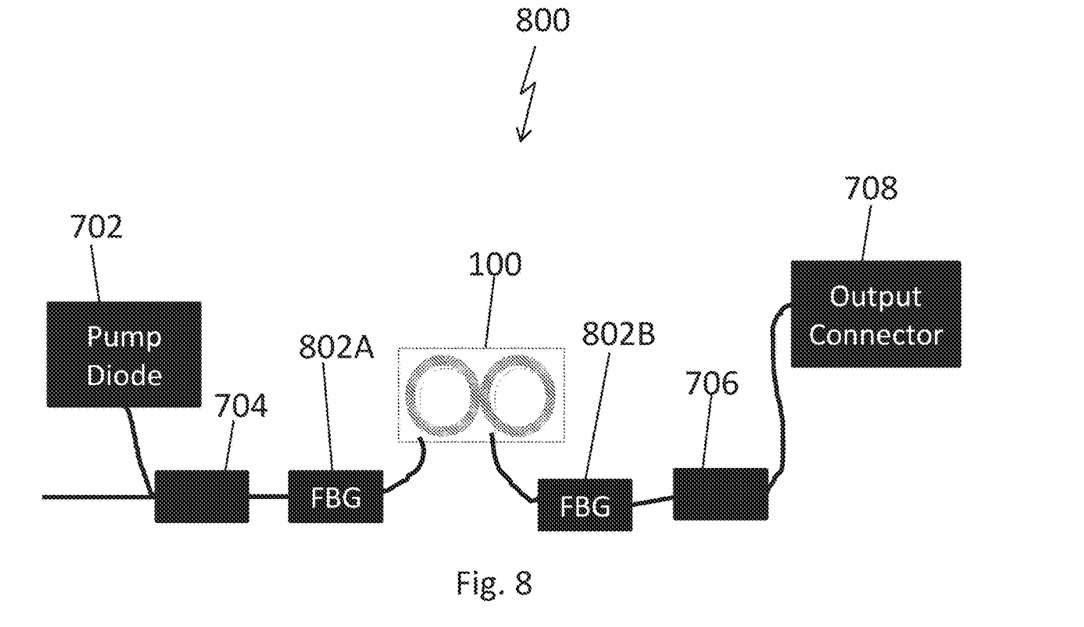
FIG. 8 shows the double spiral active fiber plate-shape base of FIG. 1 being used in a resonator.

FIG. 8 shows double spiral active fiber plate-shape base 100 being used in a resonator 800. Resonator 800 includes a pump diode 702, a pump-signal combiner 704, first FBG reflector 802A, second FBG reflector 802B, a mode stripper 706, an output connector 708, and double spiral active fiber plate-shape base 100 implemented between first FBG reflector 802A and second FBG reflector 802B.

FIG. 9 shows the resonator 800 of FIG. 8 including several points at which TMI may be measured in accordance with some embodiments of the present invention.

Point 902—the power traveling backwards through the resonator may be monitored at point 902 with a power meter, photodetector, spectrometer, or camera. Sudden jumps in power, changes in spectrum, or temporal changes may indicate TMI.

Point 904—at an unused leg of the pump combiner. The power traveling backwards through resonator 800 mainly due to the power stripped in the higher modes in the coil may be monitored at point 904 with a power meter, photodetector, spectrometer, or camera.

Points 906 and 908—at the FBG reflectors 802A and 802B respectively. At these points the TMI may be monitored by temperature change, via a temperature sensor on the component or in the cooling fluid or a thermal camera, or by monitoring scattered light through the package with a spectrometer or intensity detector.

Point 910—at double spiral active fiber plate-shape base 100. In accordance with some embodiments of the present invention, the active fiber may be monitored at point 910 by using either a thermal sensor embedded in double spiral active fiber plate-shape base 100 or a thermal camera for monitoring changes in the cooling system temperature or changes in the scattered light spectrum.

Point 912—at the mode stripper. In accordance with some embodiments of the present invention, the power in point 912 may be easily monitored using a power meter, photodector, camera, or spectrometer to look for changes in stripped laser signal light.

In accordance with some embodiments of the present invention, temperature variations may be monitored using at least one temperature sensor connected in proximity to the fiber or directly to a fiber coupled component.

Point 914—the output beam may be monitored at point 914 using either a power meter, to reveal sudden changes in efficiency or even power drops when the coil strips a significant amount of higher order modes, or a camera/aperture with a photodetector to detect temporal fluctuations of the output signal.

It should be noted that temperature changes can also be monitored in the output connector 708 as these connectors typically contain a mode stripper. Sudden changes in temperature would indicate TMI.

In accordance with some embodiments, the output of the fiber laser may be monitored using a camera, photodetector, power meter, or camera to detect sudden reduction of laser efficiency, loss in power, fluctuation in beam profile, or temporal fluctions in beam power or modal content. In addition, heating of certain components, i.e., splices and mode strippers, may indicate TMI.

In accordance with some embodiments of the present invention, monitoring TMI threshold may be performed by monitoring the amount of stripped light that is not in the fiber core, i.e., the fiber first or second clad, with a power meter, fast photodetector, or camera, and in certain embodiments through an unused pump combiner leg or fiber tap.

In addition monitoring the spectrum of the light in the clad, i.e., by monitoring the pump dump stripped spectrum, may show when the signal leaks into the clad.

It should be noted that double spiral active fiber plate-shape base 100 may be part of an amplifier, fiber laser resonator, or ASE source and may include at least two spirals in accordance with some embodiments of the present invention.

It should be further noted that unlike a spiral based on a hippodrome configuration in which the output power is limited by modal instability, in the case of the double spiral active fiber plate of the present invention, the output power is higher by at least 50% over the output power of the hippodrome configuration while keeping pump diodes (spectra) and pump geometry constant.

The invention claimed is:

1. An active fiber package for use in a fiber laser, amplifier, or ASE source comprising:
    a plate-shape base comprising a groove or a slot having a configuration of at least two spirals for receiving and fixedly holding an active fiber therein, said at least two spirals are coplanar enabling visibility of said active fiber, an outer loop of one spiral transitioning smoothly to an outer loop of another spiral, and an inner loop of each one of said at least two spirals transitioning smoothly into a relatively short straight section;
    wherein a portion of said straight section of one of said spirals spliced to a coupling fiber, and
    wherein multiple inner loops of each one of said spirals are close to said straight section having a relatively low radius of curvature for enabling tight coiling of said active fiber, thus, for reducing thermal modal instability (TMI) and increasing laser power.

2. The active fiber package of claim 1, wherein the active fiber package allows for complete visibility of the fiber during an assembly process of said active fiber, and partial visibility of the fiber during operation.

3. The active fiber package of claim 1, wherein said groove has at least one of: a u-groove shape, a v-groove shape, or a rectangular shape.

4. The active fiber package of claim 1, wherein said groove is continuous.

5. The active fiber package of claim 1 wherein at least one of said spirals is circular, oval, elliptical.

6. The active fiber package of claim 5, wherein said active fiber crosses over said spirals to enter or exit the inner radius of each of said spirals, and wherein an air gap separating between said spirals and said fiber crosses over said spirals.

7. The active fiber package of claim 1, wherein input and output sides of said spirals enter and exit at the same height into and from a coil of the active fiber.

8. The active fiber package of claim 1, wherein an entrance and an exit to said spirals smoothly transition to surfaces above said spirals.

9. The active fiber package of claim 1, wherein said coplanar spirals enable integration of said active fiber with fiber components selected from: pump combiners, fiber Bragg gratings (FBG), output connector, mode strippers, and a delivery fiber.

10. The active fiber package of claim 1 wherein a potting compound secures said groove, the potting compound being selected from: optically clear and/or thermally transmissive adhesives, a fiber recoat material, a thermal adhesive, a light transmittive adhesive and a combination thereo.

11. The active fiber package of claim 1, wherein a length of said straight section containing the splice ranges between 5 to 50 mm from an entrance of said spiral.

12. The active fiber package of claim 1, wherein at least one temperature sensor is embedded in said plate-shape base to monitor power losses.

13. The active fiber package of claim 1, wherein said plate-shape base is a heat conducting base for cooling of said active fiber and/or splices.

14. The active fiber package of claim 1 further comprising a cooling system for cooling said active fiber when said laser package is in operation; wherein said cooling system comprises one or more of:
    a planar plate-shape layer situated underneath said plate-shape base, said plate-shape layer comprising at least one groove channel for receiving and fixedly holding at least one fluid channel for cooling said active fiber during operation; and
    at least one pipe made of a thermally conducting material selected from metals, alloys and the like for transferring heat to a liquid or gas,
    wherein said cooling system recirculates either water, liquid metal, gas or any other fluid.

15. The active fiber package of claim 14, wherein, a fluid seal is used for sealing said plate-shape layer and said plate-shape base.

16. The active fiber package of claim 15, wherein, an o-ring is positioned in said at least one groove channel of said plate-shape layer for tracing said at least one fluid channel.

17. The active fiber package of claim 14, wherein said plate-shape base and/or said plate-shape layer are made of thermally conductive material selected from metals, alloys, glass and a combination thereof.

18. The active fiber package of claim 1, wherein said fiber package comprises at least one window section for positioning said active fiber in groove lines of said spirals.

19. The active fiber package of claim 1, wherein said active fiber is monitored using at least one of: a thermal camera, a thermal sensor which is embedded in said plate-shape base for detecting changes in the cooling system temperature or changes in the scattered light spectrum.

20. The active fiber package of claim 1, wherein said active fiber is selected from:
    few-mode to multi-mode fibers;
    low NA fibers;
    photonic band gap fibers;
    low NA solid core fibers.

* * * * *